United States Patent Office 2,825,706
Patented Mar. 4, 1958

2,825,706

COATING COMPOSITIONS COMPRISING POLYTETRAFLUOROETHYLENE AND PHENOL ALDEHYDE, AND ARTICLE COATED THEREWITH

Philip F. Sanders, Lima, Pa., assignor to E. I. du Pont de Nemours and Company, Wilmington, Del., a corporation of Delaware No Drawing. Application November 23, 1954
Serial No. 470,815

20 Claims. (Cl. 260—14)

This invention relates to tetrafluoroethylene resin coating compositions and more particularly to tetrafluoroethylene resin coating compositions modified with heat-reactive phenol aldehyde resins.

Liquid coating compositions cotnaining tetrafluoroethylene resin as the principal organic film-forming material are used to coat a wide variety of substrates, such as metals, ceramics, glass fabrics, and the like, with coatings which provide electrical insulation, high temperature resistance, chemical resistance, and lubricity or anti-sticking properties.

Even though polytetrafluoroethylene (tetrafluoroethylene resin), itself, has unusual resistance to the corrosive and dissolving action of chemicals, thin coatings (of the order of 0.25 to 2 mils thick) deposited from liquid coating compositions based on polytetrafluoroethylene frequently do not completely prevent rusting, corrosion, or other deterioration of the substrate. Also, such polytetrafluoroethylene coatings frequently do not adhere well to the substrate. Obviously, these deficiencies limit the broad utility of such coatings in the industrial arts.

The main object of this invention is to provide liquid coating compositions containing tetrafluoroethylene resin as the principal film-forming material, cured thin coatings of which adhere well to the substrate and protect it from corrosion, rusting and other chemical deterioration. Another object is to provide tetrafluoroethylene resin-containing primers which have these properties and also form a suitable first coat to which other subsequently applied organic coatings adhere well. A further object is to provide tetrafluoroethylene resin coating compositions which, although modified, retain the advantages of the unmodified compositions. A still further object is to provide articles coated with tetrafluoroethylene resin coating compositions having the above described properties.

These objects are accomplished by providing liquid coating compositions comprising an aqueous suspensoid of colloidal tetrafluoroethylene resin modified with 5%–100%, based on the weight of the tetrafluoroethylene resin, of heat-reactive phenol aldehyde resin. The latter may be in the form of a water-soluble resin, a water solution thereof, a water-dispersible resin, a water dispersion thereof, an organic solvent-soluble resin or an organic solution thereof.

Other compatible film-forming materials, particularly certain acrylonitrile polymers, may be added to the compositions defined above, in amounts up to 100% by weight of the tetrafluoroethylene resin, to provide further embodiments of this invention.

Tetrafluoroethylene resin (polytetrafluoroethylene) is disclosed in Plunkett U. S. Patent 2,230,654, issued February 4, 1941. Polytetrafluoroethylene in the form of an aqueous suspensoid of colloidal particles is disclosed in Renfrew U. S. Patent 2,534,058, issued December 12, 1950. Relatively concentrated aqueous suspensoids of polytetrafluoroethylene are disclosed in Berry U. S. Patent 2,478,229, issued August 9, 1949; and these are the most convenient forms to use in this invention.

The heat-reactive phenol aldehyde resins useful in this invention are commercially available resinous reaction products of one or more phenols with one or more aldehydes. The term heat-reactive means heat-convertible or thermosetting, i. e. capable, when heated, of becoming infusible and insoluble in solvents which dissolve the original heat-reactive resin.

The following specific examples are provided to illustrate the principles and practice of this invention, but it is not intended to be limited by these specific examples. Unless otherwise indicated, the parts and percentages are by weight.

Example 1

An improved aqueous tetrafluoroethylene resin coating composition of this invention was prepared by intimately mixing the following ingredients:

| | Parts by weight |
|---|---|
| Aqueous suspensoid of tetrafluoroethylene resin | 50.0 |
| Aqueous heat-reactive phenol formaldehyde resin | 30.3 |
| Water | 19.7 |
| | 100.0 |

The aqueous suspensoid of tetrafluoroethylene resin contained 60% by weight of colloidal polytetrafluoroethylene dispersed in water containing, as a wetting agent, a small amount of a sodium salt of the sulfuric acid ester of a mixture of long chain alcohols, predominantly lauryl alcohol. Obviously, other suitable wetting agents may be used in place of this particular one.

The aqueous heat-reactive phenol formaldehyde resin was "Bakelite" Resin BR–15100 (Bakelite Division, Union Carbide and Carbon Corporation). It contained 66% resin by weight. The resin was apparently in solution because the product was clear and transparent. However, the product develops a cloudiness when diluted progressively with water. BR–15100 is a monohydroxybenzene formaldehyde resin made in accordance with Meharg U. S. Patent 2,190,672.

This composition contained about 67% of heat-reactive phenol formaldehyde resin, by weight based on the weight of the polytetrafluoroethylene.

Three sets of test panels were prepared for comparing the performance of this composition with an unmodified prior art tetrafluoroethylene resin coating composition exemplified by the aqueous dispersion of tetrafluoroethylene used in preparing the product of this example.

One set of bonderized steel panels and untreated (bare) steel panels were sprayed with the unmodified tetrafluoroethylene resin coating composition, thinned with water to spraying consistency, in an amount sufficient to provide a dry film thickness of about 0.5 mil. The panels were baked for 5 minutes at 700° F. This set represented the prior art.

A second set was coated in the same manner with the product of this example, except that they were baked for 20 minutes at 400° F. This set represented one embodiment of this invention.

A third set, to demonstrate a multiple coat embodiment of this invention, was prepared by applying a first coat (primer) of the product of this example at a dry film thickness of about 0.5 mil and giving it a short bake at a very high temperature, 45 seconds at 1050° F. The panels were then cooled and sprayed with a topcoat of the unmodified prior art tetrafluoroethylene resin coating composition, thinned with water to spraying consistency. The topcoat was about 0.6 mil thick, and the two coats together were about 1.1 mils thick. The panels were baked again to fuse or cure the topcoat, this time for 1 minute at 1050° F.

The coatings were tested for adhesion, and it was found that the second and third sets, representative of this invention, were markedly superior to the first set, representative of the prior art.

A series of the panels which were coated as described above were tested for corrosion resistance in a severe accelerated test which involved exposing the coated surface continuously to a salt water spray. Those coated with the unmodified prior art tetrafluoroethylene resin composition, i. e. the first set, developed definite rusting of the steel under the coating in less than 24 hours. Those coated with one coat of the product of this example, i. e. the second set, did not develop any rust spots in 48 hours, twice as long an exposure. In the third set, which were first coated with the product of this example and then topcoated with an unmodified tetrafluoroethylene resin composition, the untreated steel panel lasted 96 hours before starting to rust and the bonderited steel panel lasted 525 hours.

The improvement in adhesion and protection against corrosion shown in this example make the products of this invention more useful than those of the prior art in industrial applications where polytetrafluoroethylene coatings are desired for some of their other important properties. One example is steel cartridge cases for military cannon, where heat resistance, lubricity, adhesion and protection against corrosion are all required. Another example is metal tanks which contain corrosive chemicals, particularly at high temperatures.

Modifications of this example may be made by merely increasing or decreasing the phenol aldehyde resin content within the range of 5%–100% by weight based on the tetrafluoroethylene resin. The preferred modifications contain at least 10% of phenol aldehyde resin on the same basis.

Obviously, tetrafluoroethylene and phenol aldehyde resin compositions having solids contents greater or less than those shown may be used. Also, other heat-reactive phenol aldehyde resins may be substituted for the particular one used in this example to produce coating compositions having equivalent properties.

The following Examples 2 and 3 are aqueous coating compositions of this invention which possess properties substantially equal to the product of Example 1, and which contain an acrylonitrile polymer in addition to the essential tetrafluoroethylene and heat-reactive phenol aldehyde resins. They may be prepared and applied in the manner described in Example 1.

*Example 2*

| | Parts by weight |
|---|---|
| Aqueous suspensoid of tetrafluoroethylene resin | 42.3 |
| Wetting agent | 0.5 |
| Aqueous heat-reactive phenol formaldehyde resin | 2.4 |
| Aqueous dispersion of acrylonitrile tripolymer | 37.5 |
| Furfuryl alcohol | 5.0 |
| Aqueous ammonia | 1.2 |
| Water | 11.1 |
| | 100.0 |

The tetrafluoroethylene and phenol formaldehyde resin ingredients were the same as in Example 1. The wetting agent was a sodium salt of the sulfuric acid ester of a mixture of long chain alcohols, predominantly lauryl alcohol.

The aqueous dispersion of acrylonitrile tripolymer contained 41.3% solids and was prepared by polymerizing 63 parts of acrylonitrile, 32 parts of butyl acrylate and 5 parts of methacrylic acid in an aqueous medium. The preparation of this tripolymer is described in detail in Example 1 of the copending application of J. J. Sanderson, Serial No. 369,890, filed July 23, 1953.

The aqueous ammonia was used in sufficient amount to produce a pH of about 10 in the total composition.

The coating composition of this example contained about 6.2% phenol formaldehyde resin and about 61% acrylonitrile tripolymer based on the weight of the tetrafluoroethylene resin.

In addition to being applied on metal, the product of this example was sprayed on a ¼″ thick panel of "Lucite" acrylic resin, which was subsequently baked for about 16 hours at 203° F. The resulting adherent coating protected the plastic panel from the softening and crazing action of organic solvents.

*Example 3*

| | Parts by weight |
|---|---|
| Aqueous suspensoid of tetrafluoroethylene resin | 33.3 |
| Aqueous dispersion of acrylonitrile interpolymer | 46.0 |
| Aqueous heat-reactive phenol formaldehyde resin | 6.0 |
| Tetramethylene sulfone | 6.0 |
| Aqueous ammonia | 1.4 |
| Water | 7.3 |
| | 100.0 |

The tetrafluoroethylene and phenol formaldehyde resin ingredients were the same as in Example 1.

The acrylonitrile interpolymer contained 34.8% solids and was prepared by polymerizing 50 parts of acrylonitrile, 30 parts of butyl acrylate, 10 parts of methacrylic acid and 10 parts of glycidyl methacrylate in an aqueous medium. The preparation of this polymer is described in detail in Example 4 of the copending application of P. F. Sanders, Serial No. 369,968, filed July 23, 1953.

The aqueous ammonia was used in sufficient amount to produce a pH of about 9.5 in the total composition.

This coating composition contains about 20% of heat-reactive phenol formaldehyde resin and about 80% of acrylonitrile interpolymer, by weight based on the tetrafluoroethylene resin.

In addition to being useful on metal, the product of this example may be used to impregnate glass fabric such as type ECC 108 "Fiberglas" Cloth (Owens-Corning Fiberglas Corporation), followed by a force dry at 250° F. for 10 minutes and a bake at 700° F. for 30 seconds. The resulting impregnated cloth is chemical resistant and is an excellent protecting and insulating material for electrical conductors.

*Example 4*

The following is an example of an adherent and corrosion resistant coating composition of this invention in which the liquid medium consists almost entirely of organic solvents, in contrast with the aqueous medium of the previous examples. The composition was prepared by adding and mixing the ingredients stepwise in the order mentioned.

| | Parts by weight |
|---|---|
| Ethyl alcohol | 18.0 |
| Butyl alcohol | 22.3 |
| Methyl ethyl ketone | 13.4 |
| Toluol | 13.4 |
| Xylol | 22.3 |
| Heat-reactive phenol formaldehyde resin solution | 4.3 |
| Aqueous suspensoid of tetrafluoroethylene resin | 6.3 |
| | 100.0 |

The tetrafluoroethylene resin ingredient was the same as in Example 1.

The phenol formaldehyde resin solution had the following composition:

| | Parts by weight |
|---|---|
| Ethyl alcohol | 14.2 |
| Butyl alcohol | 17.0 |
| Methyl ethyl ketone | 10.7 |
| Toluol | 12.0 |
| Xylol | 17.1 |
| Heat-reactive phenol formaldehyde resin ("Bakelite" BR-17620) | 27.5 |
| Polyvinyl butyral ("Butvar" resin B-90, Monsanto Chemical Company) | 1.3 |
| Ethyl cellulose (N-100, Hercules Powder Company) | 0.2 |
| | 100.0 |

In this composition the heat-reactive phenol formaldehyde resin was present in the amount of about 31% based on the weight of the tetrafluoroethylene resin. The polyvinyl butyral and/or ethyl cellulose may be omitted from this composition and the proportions of tetrafluoroethylene resin and phenol formaldehyde resin may be altered within the previously defined range without adversely affecting adhesion and corrosion resistance.

The 60% polytetrafluoroethylene dispersion employed in the examples is a convenient concentration but this concentration is not essential. Dispersions at other concentrations, such as between 25% and 75%, may be substituted in the examples, and used in other compositions of this invention. Obviously, substitutions should be on the basis of an equal weight of tetrafluoroethylene resin. Also, dispersions of tetrafluoroethylene resin in other materials (for instance, octane) may be used.

It will be obvious to those skilled in the organic coating art that a wide variety of heat-reactive phenol aldehyde resins may be substituted in the foregoing examples in equivalent amounts and may be used in other coating compositions of this invention. Such heat-reactive phenol aldehyde resins are convertible to an insoluble, infusible state when heated. They may be used in the form of dispersions or solutions in aqueous or volatile organic liquid media. They are prepared from various phenols, such as phenol (monohydroxy-benzene), cresol, xylenol, resorcinol, phenyl phenol or butyl phenol, and various aldehydes, such as formaldehyde and furfuraldehyde. The resins prepared mainly from phenol and formaldehyde are preferred. Heat reactive phenol aldehyde resins are widely available under such trade names as "Amberol," "Bakelite," "Durez," "Indur," "Resinox," "Textolite" and "Varcum."

Although the addition of 5% to 100% of phenol aldehyde resin based on the weight of tetrafluoroethylene resin provides substantially improved tetrafluoroethylene resin coatings without adversely affecting their other useful properties, the preferred proportion of phenol aldehyde resin is 10%–75%. A still further preferred range is 20%–66%. When less than 10% of phenol aldehyde resin is used, based on the weight of tetrafluoroethylene resin; it is preferred also to add at least an equal percentage, on the same basis, of another film-forming material such as the type of acrylonitrile polymer used in Examples 2 and 3.

In order to retain the desirable properties of polytetrafluoroethylene, the compositions of this invention should preferably contain at least 50% of tetrafluoroethylene resin, by weight, based on the total resins and/or other organic film-forming materials.

In place of all or part of the acrylonitrile polymers used in the examples, there may be used other three-or-four-component acrylonitrile polymers.

The three-component acrylonitrile polymers are of the type described in the copending application of J. J. Sanderson, S. N. 639,890, filed July 23, 1953, i. e. water-insoluble interpolymers derived from 100 parts of a mixture of monomers consisting of (A) 30–80 parts of acrylonitrile, (B) 2–15 parts of an alpha-olefinic monocarboxylic acid selected from the group consisting of acrylic, methacrylic, ethacrylic, phenyl acrylic, and crotonic acids, and (C) 15–65 parts of an ester of an acid defined in (B) and a 1–8 carbon atom saturated aliphatic monohydric alcohol.

The four-component acrylonitrile polymers are of the type described in the copending application of P. F. Sanders, S. N. 369,968, filed July 23, 1953, i. e. cross-linkable interpolymers derived from 100 parts of a mixture of monomers consisting of (A) 40–75 parts of acrylonitrile, (B) 2–15 parts of an alpha-olefinic monocarboxylic acid selected from the group consisting of acrylic, methacrylic, ethacrylic, phenyl acrylic, and crotonic acids, (C) 15–37.5 parts of an ester of an acid defined in (B) and a 1–8 carbon atom saturated aliphatic monohydric alcohol, and (D) 1–25 parts of a glycidol derivative selected from the group consisting of allyl glycidyl ether and glycidyl esters of the acids defined in (B).

When such acrylonitrile polymers are used in the compositions of this invention, it is desirable but not essential to include a water-miscible solvent as a coalescing agent for the particles of acrylonitrile polymer while the composition is being dried as a coating. The following exemplify coalescing agents: furfuryl alcohol, tetramethylene sulfone, mono alkyl ethers of ethylene or diethylene glycol, diacetone alcohol, and dimethyl formamide. When a coalescing agent is used, the concentration is not critical but is preferably between 1% and 10% of the total coating composition.

While the products of this invention may be aqueous dispersions (solid particles dispersed in aqueous media), aqueous dispersion-emulsions (solid particles and particles of solutions dispersed in aqueous media), organosols (solid particles dispersed in volatile organic liquids), or organic solution-dispersions (solid particles dispersed in organic solutions); generally the most stable, and therefore the preferred products are aqueous dispersions. When the composition is an aqueous dispersion of tetrafluoroethylene resin modified solely with a phenol aldehyde resin, an acidic pH is preferred. When an acrylonitrile polymer is present as a further modifier, an alkaline pH is preferred.

Although the preferred coating compositions of this invention are clear and unpigmented, useful products may be obtained by grinding pigments, fillers and/or extenders into the liquid compositions.

The invention has been described in terms of providing coatings which are adherent and corrosion resistant at film thicknesses of 0.25–2.0 mils. It will be obvious to those skilled in the organic coating art that such film thicknesses merely provide an arbitrary basis for comparison, and that any desired film thickness consistent with the other requirements of a given coating may be used. Also multiple coats of the compositions of this invention may be used, with or without intermediate application of heat.

The coating compositions can be applied by any convenient method such as by spraying, dipping, brushing, roller-coating, or doctor-knife coating. Obviously each method requires a particular consistency or solids content which is easily controlled by withholding or adding liquid components.

The coating compositions of this invention are most useful on and most easily applied to heat resistant substrates such as ferrous metals, aluminum, copper, asbestos, glass, ceramics and the like and articles made therefrom such as metal tanks, metal screens, copper wire, glass fabrics etc. However, coatings can also be applied on more heat sensitive substrates such as plastics, cotton, regenerated cellulose fibers and films, polyacrylonitrile fibers, polyethylene terephthalate fibers and films and the like, if care is taken in the subsequent drying step not to damage the substrate.

The preferred coated articles of this invention are metal articles having a baked coating of a product of this invention. The combination of temperature and time employed in the baking step should preferably be sufficient to cure or fuse the film-forming materials into a continuous coating but never sufficient to cause the tetrafluoroethylene resin, or any substantial amount of the other film-forming materials present, to burn, decompose or volatilize.

In coatings applied as a plurality of separate coats, the new compositions of this invention may be used as both the primer coat and the topcoat. Also, they may be used as a primer coat and topcoated with a prior art tetrafluoroethylene resin coating composition; conversely, the latter may be used as a primer coat with a composition of this invention as the top coat; or either coating may be sandwiched between two or more coats of the other. The invention further contemplates the use of the coating compositions of this invention either under or over conventional organic coatings, such as coatings based for example on alkyd resins, urea formaldehyde resins, melamine formaldehyde resins, vinyl resins, acrylic resins, epoxyhydroxy polyether resins (i. e. condensation products of epichlorohydrin and diphenylolpropane) and esterification products of such polyether resins.

It is apparent that many widely different embodiments of this invention may be made without departing from the spirit and scope thereof and, therefore, it is not intended to be limited except as indicated in the appended claims.

I claim:

1. A liquid coating composition comprising colloidal tetrafluoroethylene resin, 5%–100% of heat-reactive phenol aldehyde resin, and up to 100% of other organic film-forming material, in a liquid medium comprising water; the percentages being by weight based on the tetrafluoroethylene resin, and said other organic film-forming material being a member of the class consisting of (1) polyvinyl butyral, (2) ethyl cellulose, (3) an interpolymer of 100 parts by weight of a mixture of monomers consisting of (a) 30–80 parts of acrylonitrile, (b) 2–15 parts of an alpha-olefinic monocarboxylic acid selected from the group consisting of acrylic, methacrylic, ethacrylic, phenyl acrylic, and crotonic acids, and (c) 15–65 parts of an ester of an acid defined in (b) and a 1–8 carbon atom saturated aliphatic monohydric alcohol, and (4) an interpolymer of 100 parts by weight of a mixture of monomers consisting of (A) 40–75 parts of acrylonitrile, (B) 2–15 parts of an alpha-olefinic monocarboxylic acid selected from the group consisting of acrylic, methacrylic, ethacrylic, phenyl acrylic, and crotonic acids, (C) 15–37.5 parts of an ester of an acid defined in (B) and a 1–8 carbon atom saturated aliphatic monohydric alcohol, and (D) 1–25 parts of a glycidol derivative selected from the group consisting of allyl glycidyl ether and glycidyl esters of the acids defined in (B).

2. A product of claim 1 containing 10%–75% of heat-reactive phenol aldehyde resin, by weight based on the tetrafluoroethylene resin.

3. A product of claim 1 containing 20%–66% of heat-reactive phenol aldehyde resin, by weight based on the tetrafluoroethylene resin.

4. A product of claim 1 in which the phenol aldehyde resin is a monohydroxybenzene formaldehyde resin.

5. A product of claim 1 in which the phenol aldehyde resin is water-soluble.

6. A product of claim 1 in which the phenol aldehyde resin is water-dispersible.

7. A product of claim 1 in which the phenol aldehyde resin is soluble in a volatile organic solvent.

8. A product of claim 1 in which colloidal tetrafluoroethylene resin and phenol aldehyde resin are the sole organic film-forming materials present.

9. A product of claim 1 in which said other organic film-forming material is 5%–100%, by weight based on the tetrafluoroethylene resin, of an interpolymer of 100 parts by weight of a mixture of monomers consisting of (A) 30–80 parts of acrylonitrile, (B) 2–15 parts of an alpha-olefinic monocarboxylic acid selected from the group consisting of acrylic, methacrylic, ethacrylic, phenyl acrylic, and crotonic acids, and (C) 15–65 parts of an ester of an acid defined in (B) and a 1–8 carbon atom saturated aliphatic monohydric alcohol.

10. A product of claim 9 further containing, as a coalescing agent, a water-miscible solvent for said interpolymer.

11. A product of claim 1 in which said other organic film-forming material is 5%–100%, by weight based on the tetrafluoroethylene resin, of an interpolymer of 100 parts by weight of a mixture of monomers consisting of (A) 40–75 parts of acrylonitrile, (B) 2–15 parts of an alpha-olefinic monocarboxylic acid selected from the group consisting of acrylic, methacrylic, ethacrylic, phenyl acrylic, and crotonic acids, (C) 15–37.5 parts of an ester of an acid defined in (B) and a 1–8 carbon atom saturated aliphatic monohydric alcohol, and (D) 1–25 parts of a glycidol derivative selected from the group consisting of allyl glycidyl ether and glycidyl esters of the acids defined in (B).

12. A product of claim 11 further containing, as a coalescing agent, a water-miscible solvent for said interpolymer.

13. A product of claim 1 in which the liquid medium is substantially entirely water.

14. A product of claim 1 in which the liquid medium comprises water and a volatile organic liquid.

15. A product of claim 1 in which the liquid medium comprises water and a volatile organic liquid which is a solvent for the phenol aldehyde resin.

16. The process of improving the corrosion resistance of an aqueous tetrafluoroethylene resin coating composition which comprises admixing therewith 5%–100% of phenol aldehyde resin, by weight based on the weight of tetrafluoroethylene resin.

17. An article having a dry adherent corrosion-resistant coating of a product of claim 1.

18. An article having a dry coating consisting of a plurality of separate coats of different organic coating compositions, at least one of which is a product of claim 1.

19. A metal article having a dry adherent corrosion-resistant coating of a product of claim 1.

20. Glass fabric having a dry coating of a product of claim 1.

References Cited in the file of this patent

UNITED STATES PATENTS 2,668,157   Emig _____ Feb. 2, 1954